(12) United States Patent
Rao

(10) Patent No.: US 11,387,896 B1
(45) Date of Patent: Jul. 12, 2022

(54) SATELLITE TERMINAL ANTENNA POINTING ARRANGEMENT USING SEPARATE FORWARD AND RETURN SATELLITES

(71) Applicant: SES S.A., Betzdorf (LU)

(72) Inventor: Ashok Kolar Rao, Potomac, MD (US)

(73) Assignee: SES S.A., Betzdorf (LU)

( * ) Notice: Subject to any disclaimer, the term of this patent is extended or adjusted under 35 U.S.C. 154(b) by 0 days.

(21) Appl. No.: 17/163,634

(22) Filed: Feb. 1, 2021

(51) Int. Cl.
*H04B 7/185* (2006.01)

(52) U.S. Cl.
CPC ..... *H04B 7/18528* (2013.01); *H04B 7/18526* (2013.01); *H04B 7/18586* (2013.01); *H04B 7/18589* (2013.01)

(58) Field of Classification Search
CPC .... H04B 7/1851; H04B 7/19; H04B 7/18515; H04B 7/18521; H04B 7/2041; H04B 7/185; H04B 7/18504; H04B 7/18506; H04B 7/18508; H04B 7/18513; H04B 7/18519; H04B 7/18526; H04B 7/18563; H04B 7/18571; H04B 7/1858; H04B 7/18582; H04B 7/18584; H04B 7/18597; H04W 84/06; H01Q 1/288
See application file for complete search history.

(56) References Cited

U.S. PATENT DOCUMENTS

| 5,708,963 A | 1/1998 | Mobley et al. |
| 6,018,658 A | 1/2000 | Blachier |

(Continued)

FOREIGN PATENT DOCUMENTS

| CN | 110221296 A | 9/2019 |
| JP | 2000-078067 A | 3/2000 |

(Continued)

OTHER PUBLICATIONS

[No Author Listed], 47 CFR § 25.228—Operating and coordination requirements for earth stations in motion (ESIMs). Cornell Law School Legal Information Institute. Jul. 24, 2020:9 pages. https://www.law.cornell.edu/cfr/text/47/25.228 [last accessed Feb. 15, 2021].

(Continued)

*Primary Examiner* — Philip Sobutka
(74) *Attorney, Agent, or Firm* — Wolf, Greenfield & Sacks, P.C.

(57) ABSTRACT

A terminal, allowing bidirectional communication with a gateway, receives information from the gateway through a forward satellite and sends information towards the gateway through a return satellite. The terminal comprises an antenna arrangement having a receive aperture for receiving signals from forward satellite and a transmit aperture for transmitting signals to return satellite. A controller computes a pointing direction from receive aperture towards the forward satellite based on the terminal's position and orientation, the antenna arrangement's geometry, and the forward satellite's orbital position; and computes a pointing direction from the transmit aperture towards the return satellite based on the computed pointing direction from the receive aperture towards the forward satellite and the return satellite's orbital position. The invention also relates to a system comprising a terminal and a gateway, and to a method for operating a terminal.

15 Claims, 4 Drawing Sheets

(56) References Cited

U.S. PATENT DOCUMENTS

| | | | |
|---|---|---|---|
| 6,377,981 | B1 | 4/2002 | Ollikainen et al. |
| 6,483,458 | B1 | 11/2002 | Carson |
| 6,563,457 | B2 | 5/2003 | Chang et al. |
| 6,909,896 | B2 | 6/2005 | Laufer et al. |
| 7,372,400 | B2 | 5/2008 | Cohen et al. |
| 7,477,597 | B2 | 1/2009 | Segel |
| 8,010,127 | B2 | 8/2011 | Burtner et al. |
| 9,647,748 | B1 * | 5/2017 | Mitchell ............ H04B 7/18508 |
| 10,030,995 | B2 | 7/2018 | Adler et al. |
| 10,128,931 | B2 | 11/2018 | Rothaar et al. |
| 10,524,094 | B2 | 12/2019 | Girod et al. |
| 10,575,229 | B2 | 2/2020 | Wu et al. |
| 10,615,498 | B2 | 4/2020 | Runyon et al. |
| 2002/0077099 | A1 | 6/2002 | LaPrade |
| 2002/0137509 | A1 * | 9/2002 | Laufer ................ H04B 7/19 455/427 |
| 2007/0129019 | A1 | 6/2007 | Otten et al. |
| 2015/0024677 | A1 * | 1/2015 | Gopal ................ H04L 67/12 455/13.1 |
| 2018/0062737 | A1 | 3/2018 | Wyler |
| 2018/0152235 | A1 | 5/2018 | Smoot et al. |
| 2018/0376393 | A1 * | 12/2018 | Wu ................ H04B 7/18504 |
| 2020/0212992 | A1 | 7/2020 | Preston et al. |

FOREIGN PATENT DOCUMENTS

| | | |
|---|---|---|
| JP | 2001-298390 A | 10/2001 |
| JP | 2002-016535 A | 1/2002 |
| JP | 2019-532598 A | 11/2019 |

OTHER PUBLICATIONS

[No Author Listed], Amends Rules Related to Satellite Earth Stations Mounted on Vessels, Vehicles and Aircraft. Federal Communications Commission, Federal Register. Jun. 16, 2017;82(115):27652-27674.

[No Author Listed], Conical scanning. Wikipedia. Dec. 7, 2020:4 pages. https://en.wikipedia.org/w/index.php?title=Conical_scanning&oldid=992799279 [last accessed Feb. 15, 2021].

[No Author Listed], The Hybrid Satellite Solution: When Combined Networks Mean Enhanced Connectivity. SES. Jun. 2, 2016:6 pages. https://www.ses.com/blog/hybrid-satellite-solution-when-combined-networks-mean-enhanced-connectivity [last accessed Jan. 4, 2021].

[No Author Listed], ThinAir Ka2517 data sheet, Ka-band Satcom Antenna for Global Inflight Broadband. ThinKom Solutions, Inc. Sep. 2018:2 pages. https://www.thinkom.com/wp-content/uploads/2018/09/ka2517-datasheet_9_18_web.pdf [last accessed Feb. 15, 2021].

[No Author Listed], ThinAir Ku3030 data sheet, Ka-band Satcom Antenna for Global Inflight Broadband. ThinKom Solutions, Inc. Sep. 2018:2 pages. https://www.thinkom.com/wp-content/uploads/2018/09/ku3030-datasheet_9_18_web.pdf [last accessed Feb. 15, 2021].

Jewett, ThinKom Touts Benefits of Interoperable Hybrid Antenna Solutions. Satellite Today. Sep. 29, 2020:2 pages. https://www.satellitetoday.com/ground-systems/2020/09/29/thinkom-touts-benefits-of-interoperable-hybrid-antenna-solutions/ [last accessed Feb. 15, 2021].

* cited by examiner

US 11,387,896 B1

SATELLITE TERMINAL ANTENNA POINTING ARRANGEMENT USING SEPARATE FORWARD AND RETURN SATELLITES

FIELD OF TECHNOLOGY

The invention relates to satellite communication systems, terminals therefor, and methods for operating such terminals. In particular, the invention relates to terminals for allowing bidirectional communication with a gateway, and to systems comprising such terminals and gateways. The invention may be used to, though not limited to, provide or assist in providing broadband communications to terminals, such as to provide internet connectivity.

BACKGROUND

Medium Earth orbit (MEO) satellites, which belong to the class of non geostationary orbit (NGSO) satellites, enable communications between two end points on Earth with a lower latency than geostationary orbit (GEO) satellites.

However, when orbiting over the Earth's Equator, MEO satellites (such as for example those of the O3b MEO satellite constellation) with phased array antennas typically consume more onboard power when transmitting to remote terminals at high latitudes due to the scan loss (gain loss relative to the boresight) in the spacecraft phased array antenna. Additionally, if the remote terminal uses a flat phased array antenna, there would be more scan loss in reception of signals from the MEO satellite since the scan angle (angle relative to the vertical axis) from a horizontally placed antenna to the equatorial MEO satellite is higher than the scan angle to a GEO satellite positioned above the same Earth longitude as that above which said equatorial MEO satellite is positioned.

In view of the above, there is a need for satellite communication systems notably addressing these additional losses associated with MEO satellites orbiting over the Earth's Equator. More generally, there is also a need to provide satellite communication systems that are as efficient as possible.

SUMMARY

The present invention aims at addressing, at least partially, the above-mentioned needs. The invention notably relates to a terminal as defined in independent claim 1 and to a method as defined in independent claim 13. Particular embodiments are defined in the dependent claims.

In one embodiment, a terminal is provided for allowing bidirectional communication with a gateway. The terminal is configured for receiving information from the gateway through a first satellite orbiting the Earth, said first satellite being hereinafter referred to as "forward satellite"; and for sending information towards the gateway through a second satellite orbiting the Earth, said second satellite being hereinafter referred to as "return satellite". The terminal comprises an antenna arrangement and a controller. The antenna arrangement comprises a receive aperture for receiving signals from the forward satellite, and a transmit aperture for transmitting signals to the return satellite. The controller is configured for computing a pointing direction from the receive aperture towards the forward satellite based on information indicative of the terminal's position and orientation, the antenna arrangement's geometry, and the forward satellite's orbital position; and computing a pointing direction from the transmit aperture towards the return satellite based on the above-referred computed pointing direction from the receive aperture towards the forward satellite and information indicative of the return satellite's orbital position.

The terminal allows bidirectional communication with a gateway through two satellites, while providing, in such a situation, an efficient way to compute the pointing directions of the receive and transmit apertures of the terminal's antenna arrangement.

The invention also relates to a system comprising a gateway and a terminal, as described above, for allowing bidirectional communication with the gateway. Furthermore, the invention also relates to a method for operating a terminal as described above, to a computer program or set of computer programs comprising computer-readable instructions for carrying out such a method for operating a terminal, and to related computer program products and computer-readable storage mediums.

DETAILED DESCRIPTION

The present invention shall now be described in conjunction with specific embodiments. The specific embodiments serve to provide the skilled person with a better understanding but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

Figure 1:
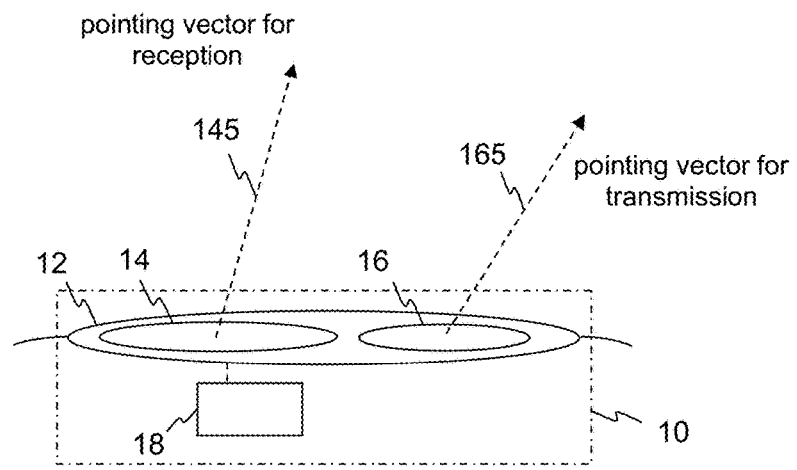
FIG. 1 schematically illustrates a terminal in one embodiment of the invention.
Figure 2:
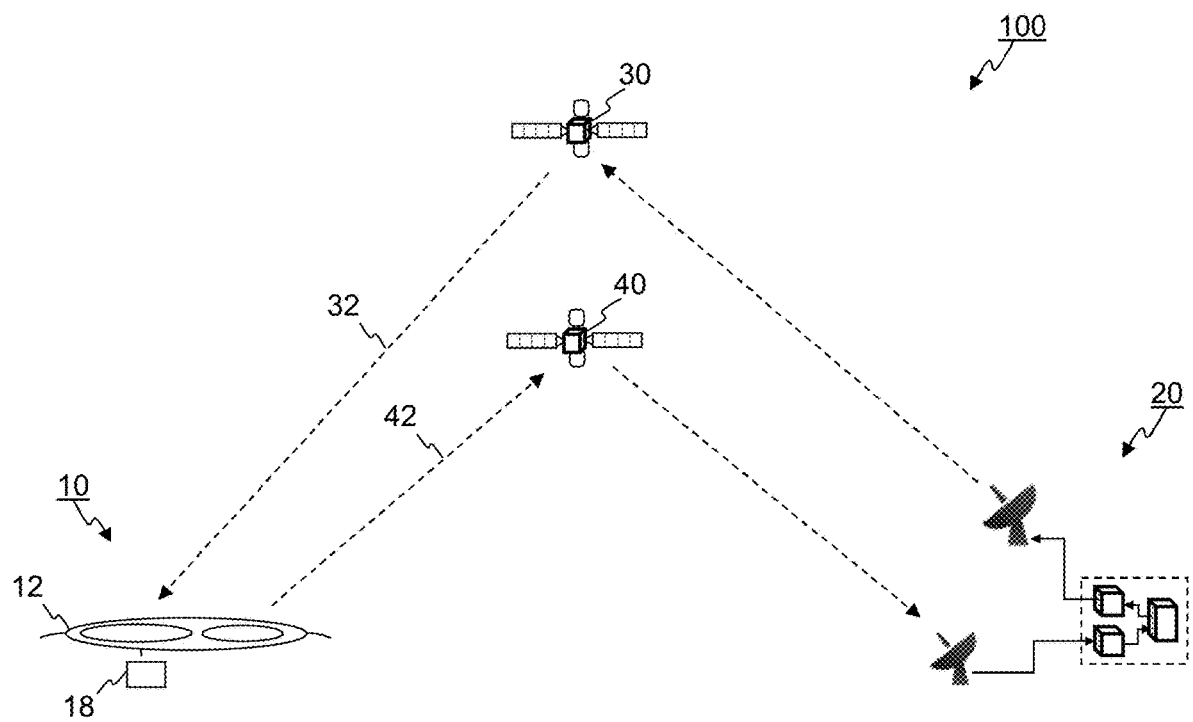
FIG. 2 schematically illustrates a satellite communication system in one embodiment of the invention.

FIG. 1 schematically illustrates a terminal 10 in one embodiment of the invention. Terminal 10 will be described not only with reference to FIG. 1 but also, for the sake of convenience, with reference to FIG. 2, which schematically illustrates an exemplary satellite communication system 100 in which terminal 10 may be operated.

Terminal 10 allows bidirectional communication with remote gateway 20. The bidirectional communication may for example be used to provide broadband communications to terminal 10 or to devices (not illustrated in the drawings) connected to terminal 10, such as for providing internet connectivity to terminal 10 or to any device(s) connected to terminal 10. Terminal 10 may remain at a fixed location on or near the Earth's surface, or it may be a mobile terminal. It may for example be attached to a ship (such as a cruise ship or a cargo ship), an airplane (such as a passenger airliner), or a train, and may be used to provide broadband communications to one or a plurality of devices located on or in the ship, airplane, or train, respectively. Although not illustrated in FIG. 2, satellite communication system 100 may comprise a plurality of terminals 10 each allowing bidirectional communication with gateway 20. In one embodiment, satellite communication system 100 may comprise a plurality of gateways 20, and terminal 10 may allow bidirectional communication with one, some, or all of these gateways 20.

Terminal 10 is configured for receiving information-carrying signals from gateway 20 through a first satellite 30 orbiting the Earth, said first satellite 30 being here referred to as "forward satellite" 30. Terminal 10 is also configured for sending information-carrying signals towards gateway 20 through a second satellite 40 orbiting the Earth, said second satellite 40 being here referred to as "return satellite" 40. The information received by terminal 10 and the information transmitted by terminal 10 may each comprise digital information converted into an analog electromagnetic signal (for example by modulating one or more carriers) for transmission to or from gateway 20 through satellites 30, 40. In one embodiment, gateway 20 is connected to one or more elements and/or networks (not illustrated in the drawings), to provide for example access to computer servers hosting information, services, or the like. In one embodiment, satellite communication system 100 may comprise a plurality of forward satellites 30 (not illustrated in the drawings) and/or a plurality of return satellites 40 (not illustrated in the drawings), and terminal 10 may be capable of switching from one satellite to another satellite in accordance with a suitable handover procedure, for example when required to do so by a change in position of the satellites and/or terminal 10.

Terminal 10 comprises an antenna arrangement 12 and a controller 18. Antenna arrangement 12 comprises a receive aperture 14 suitable for receiving electromagnetic signals from forward satellite 30, and a transmit aperture 16 suitable for transmitting electromagnetic signals to return satellite 40. Receive aperture 14 and transmit aperture 16 are both independently steerable (electronically and/or mechanically steerable), so that the pointing direction of each aperture may be changed independently. Antenna arrangement 12 is therefore a dual-beam antenna arrangement. In one embodiment, antenna arrangement 12 comprises a single circuit board for receiving and radiating electromagnetic signals, with receive aperture 14 and transmit aperture 16 being therefore arranged on said single common circuit board. In one embodiment, receive aperture 14 and transmit aperture 16 are both arranged under, and protected by, a single common radome. In one embodiment, antenna arrangement 12 comprises a mechanical mounting fixture or supporting structure that is common to both receive aperture 14 and transmit aperture 16, said fixture or structure being hereinafter referred to as "adapter plate" (for example for attaching antenna arrangement 12 to an aircraft's fuselage). In one embodiment, receive aperture 14 and transmit aperture 16 are both arranged under, and protected by, a single common radome, and they also share a common adapter plate (and they may also be arranged on a single common circuit board, as mentioned above). In one embodiment, terminal 10 further comprises a common modem for serving both receive aperture 14 and transmit aperture 16.

Controller 18 is configured for computing pointing direction 145 (as schematically illustrated in FIG. 1, for example), from receive aperture 14 towards forward satellite 30 based on information indicative of the terminal's position and orientation, information indicative of the antenna arrangement's geometry, and information indicative of forward satellite's 30 orbital position. The information indicative of forward satellite's 30 orbital position may be available from two-line element (TLE) files (i.e., ephemeris file(s)) stored in controller 18. TLE files may be updated through any suitable means, for example over the air, when they change. An update may be performed by a technician or automatically. TLE files may be needed for NGSO satellites only, since GEO satellites are fixed with respect to the Earth. In one embodiment, controller 18 is also configured, after computing above-referred pointing direction 145, to instruct antenna arrangement 12 and/or receive aperture 14 to steer the receiving pattern of receive aperture 14 in accordance with computed pointing direction 145.

Controller 18 is further configured to compute pointing direction 165 (as schematically illustrated in FIG. 1, for example) from transmit aperture 16 towards return satellite 40 based on computed pointing direction 145 (i.e., from receive aperture 14 towards forward satellite 30) and information indicative of return satellite's 40 orbital position. The information indicative of return satellite's 40 orbital position may also be available from TLE files stored in controller 18. Again, such TLE files may be updated through any suitable means, for example over the air, when they change. In one embodiment, controller 18 is also configured, after computing above-referred pointing direction 165, to instruct antenna arrangement 12 and/or transmit aperture 16 to steer the radiation pattern of transmit aperture 16 in accordance with computed pointing direction 165.

Figure 3A:
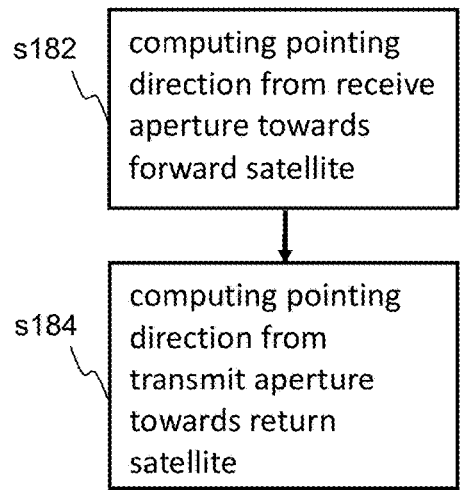
FIGS. 3a and 3b are flowcharts of operations that the terminal's controller may be configured to perform in two embodiments of the invention.

These operations that controller 18 is configured to perform are also illustrated by the flowchart of FIG. 3a, comprising computing s182 pointing direction 145 and then computing s184 pointing direction 165 based on the outcome of step s182. Although not illustrated in FIG. 3a, operations s182 and s184 may be repeated over time to dynamically adjust pointing directions 145 and 165 of apertures 14 and 16, respectively, as a result of changes in position of satellites and/or changes in position and orientation of terminal 10. The repetition's frequency may be fixed or may depend on factors such as whether terminal 10 is mobile and, if so, to which extent.

By computing a pointing direction, controller 18 computes directional information that is usable to cause an instruction to be issued leading an antenna arrangement aperture to be steered, i.e. controlled, so that a maximum of its receiving or radiation pattern points in a particular direction. In one embodiment, a pointing direction is a pointing vector.

In one embodiment, controller 18 is arranged outside antenna arrangement 12 and connected thereto through a wired or wireless connection. In another embodiment, controller 18 forms part of antenna arrangement 12. In yet another embodiment, controller 18 is such that one part thereof is arranged outside antenna arrangement 12 and the remaining part forms part of antenna arrangement 12.

Controller 18 may be any suitable processing device (or any suitable combination of processing devices) for computing pointing directions 145, 165. Optionally, controller 18 may additionally be configured to perform operations other than computing pointing directions 145, 165. A processing device may for example be: a computer, a microprocessor, a microcontroller-based platform, an integrated circuit, or an application-specific integrated circuit (ASIC).

Figure 3B:
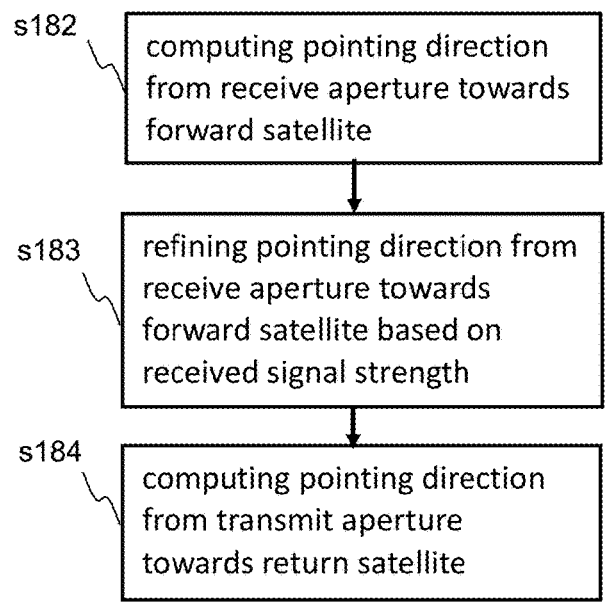

Controller 18 computes pointing direction (or pointing vector) 145 from receive aperture 14 towards forward satellite 30 based on (at least) three elements: (i) information indicative of the terminal's 10 position and orientation, which may be known or obtained from equipment arranged on terminal 10 (if terminal 10 is attached to an aircraft, information indicative of the terminal's 10 position and orientation may be derived from the aircraft position and yaw/heading, pitch, and roll as provided by the aircraft instruments); (ii) information indicative of the antenna arrangement's 12 geometry (i.e., with respect to terminal 10), which is known; and (iii) information indicative of forward satellite's 30 orbital position/location, which is also known (e.g., based on ephemeris file or TLE data). Controller 18 may compute pointing direction 145 using elements (i), (ii), and (iii) and geometrical and trigonometrical calculations. A skilled person would recognize that elements (i), (ii), and (iii) provide a complete information set on the basis of which pointing direction 145 can be computed, and the skilled person would also recognize that these geometrical and trigonometrical calculations may be performed in many different ways. Optionally, controller 18 may also refine or "peak" pointing direction 145 based on the received signal strength, as illustrated by step s183 of FIG. 3b. This refinement or "peak" process may be done by moving the pointing direction off the target and scanned in a pattern so as to arrive at the maximum (see e.g. the first two sections of the article "Conical scanning," on Wikipedia, The Free Encyclopedia, as accessed on Jan. 27, 2021 from: https://en.wikipedia.org/w/index.php?title=Conical_scanning&oldid=992799279).

Controller 18 may then use pointing direction 145 to dynamically compute pointing direction 165 (or pointing vector 165) to return satellite 40 for transmit aperture 16 based on information about the current location of return satellite 40 in its orbit and, optionally, the geometry of the antenna arrangement installation. This computation may be done using geometrical and trigonometrical calculations. The location of return satellite 40 at any instant is known, by being for example available from TLE files. Pointing direction 165 may either directly be used as pointing vector for transmit aperture 16 or, optionally, may be first corrected to account for the geometry of the antenna arrangement installation (including the distance between apertures 14 and 16), and to account for the terminal's 10 orientation, from which the position of transmit aperture 16 relative to that of receive aperture 14 is derivable.

The computation of pointing direction 165 may be done using geometrical and trigonometrical calculations for example in the light of the following considerations (for an exemplary case of an antenna arrangement 12 attached to an airplane): Pointing direction 165 to return satellite 40 from a point on antenna arrangement 12 may be computed as an azimuth (angle from the North-South direction) and elevation angle to the horizontal plane. This azimuth/elevation pointing depends only on the satellite position and airplane latitude/longitude and is essentially invariant across antenna arrangement 12 (as the latitude/longitude barely changes across the antenna). If both transmit aperture 16 and receive aperture 14 are exactly in the North-South direction (airplane flying North and apertures installed perfectly along the length of the airplane) and the airplane is completely level (no pitch or roll), both apertures 14, 16 have the same pointing direction, which is the azimuth/elevation angle. If the receive aperture 14 is perfectly aligned along the length of the airplane and the transmit aperture length side is 0.1 degree skewed to the length of the airplane, pointing direction 165 from transmit aperture 16 would need to be adjusted by 0.1 degree. In other words, if the aperture pointing direction is defined with respect to the side along the length of the airplane and the horizontal plane, a tolerance in mounting (i.e., an installation inaccuracy) needs to be adjusted for computing the pointing direction vis-à-vis the side of the aperture.

Using pointing direction 145, i.e. the pointing direction for receiving at receive aperture 14, to compute pointing direction 165, i.e. the pointing direction for transmission at transmit aperture 16, is an efficient way to compute pointing direction 165 from the point of view of the amount of computation required (and thus also regarding the energy required therefor). Indeed, since information about the terminal's 10 position and orientation are already accounted for in pointing direction 145, obtaining and processing this information again to compute pointing direction 165 is unnecessary. This stems from the facts that, first, receive aperture 14 and transmit aperture 16 are part of the same antenna arrangement 12 so that they are in a known positional relationship with each other, and, second, the orbital location of satellites 30 and 40 is known and generally predictable over time.

Furthermore, first computing pointing direction 145, i.e. the pointing direction for receive aperture 14, and then computing pointing direction 165, i.e. the pointing direction for transmit aperture 16, using computed pointing direction 145, rather than the other way around, is advantageous because this enables receiving a signal from forward satellite 30, adjusting (refining) pointing direction 145 to forward satellite 30 to optimize the received signal strength (as illustrated by step s183 of FIG. 3b), and only then computing pointing direction 165 using adjusted (refined) pointing direction 145. This adjustment (refinement) process on the terminal's side alone is not possible for transmit aperture 16. Computing pointing direction 165 using adjusted (refined) pointing direction 145 may significantly improve the directional accuracy of transmission from transmit aperture 16, and may thus significantly reduce interference to neighboring satellites.

In one embodiment, terminal 10 is configured for communicating with gateway 20 in such a way that (for example, in accordance with a communication protocol according to which) at least m percent of the payload information from gateway 20 to terminal 10 is transmitted through forward satellite 30 and at least n percent of the payload information from terminal 10 to gateway 20 is transmitted through return satellite 40, wherein m is a value in the range of 75 to 100 and n is a value in the range of 75 to 100. In one embodiment, m and n are values in the range of 90 to 100. In another embodiment, m and n are values in the range of 95 to 100. In yet another embodiment, m and n are values in the range of 97.5 to 100. In other embodiments, m and n are values in the range of 99 to 100, in the range of 99.5 to 100, in the range of 99.75 to 100, or in the range of 99.9 to 100. In one embodiment, m equals 99.95 and n equals 99.95. In one embodiment, terminal 10 is configured for communicating with gateway 20 in such a way that all the payload information from gateway 20 to terminal 10 is transmitted through forward satellite 30 and all the payload information from terminal 10 to gateway 20 is transmitted through return satellite 40. Thus, in this embodiment, when it comes to the bidirectional communication between gateway 20 and terminal 10, forward satellite 30 is only used for the forward link to terminal 10 and return satellite 40 is only used for the return link from terminal 10.

These embodiments may be particularly advantageous for example if forward satellite 30 is a GEO satellite (or more generally a geosynchronous orbit (GSO) satellite), and if return satellite 40 is a MEO or low Earth orbit (LEO) satellite (or more generally a NGSO satellite orbiting at an altitude lower than that of the GEO). These configurations indeed provide lower latencies than configurations involving a single GEO satellite, and without the drawbacks in terms of increased onboard power consumption associated with a forward MEO or LEO satellite (as discussed in the above "Background" section) and potential scan loss at the terminal for receiving from a MEO or LEO satellite (as also discussed in the "Background" section).

Figure 4:
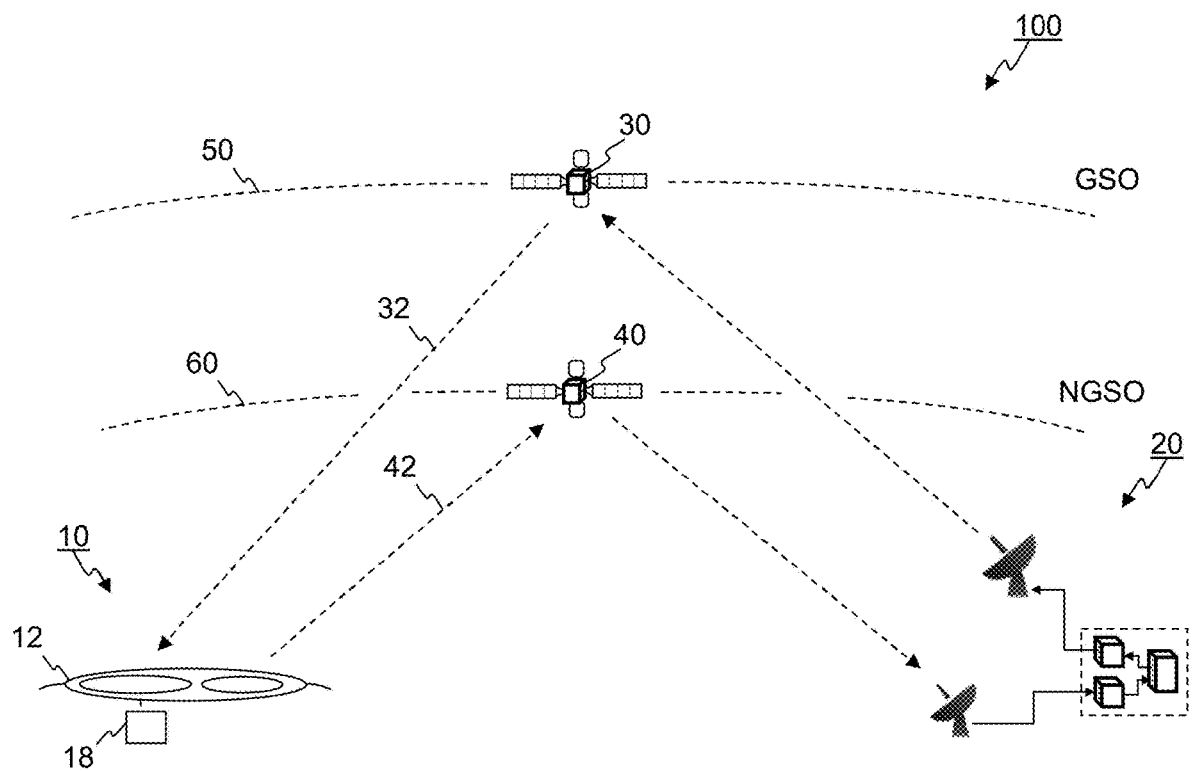
FIGS. 4 to 6 schematically illustrate satellite communication systems in three embodiments of the invention.
Figure 5:
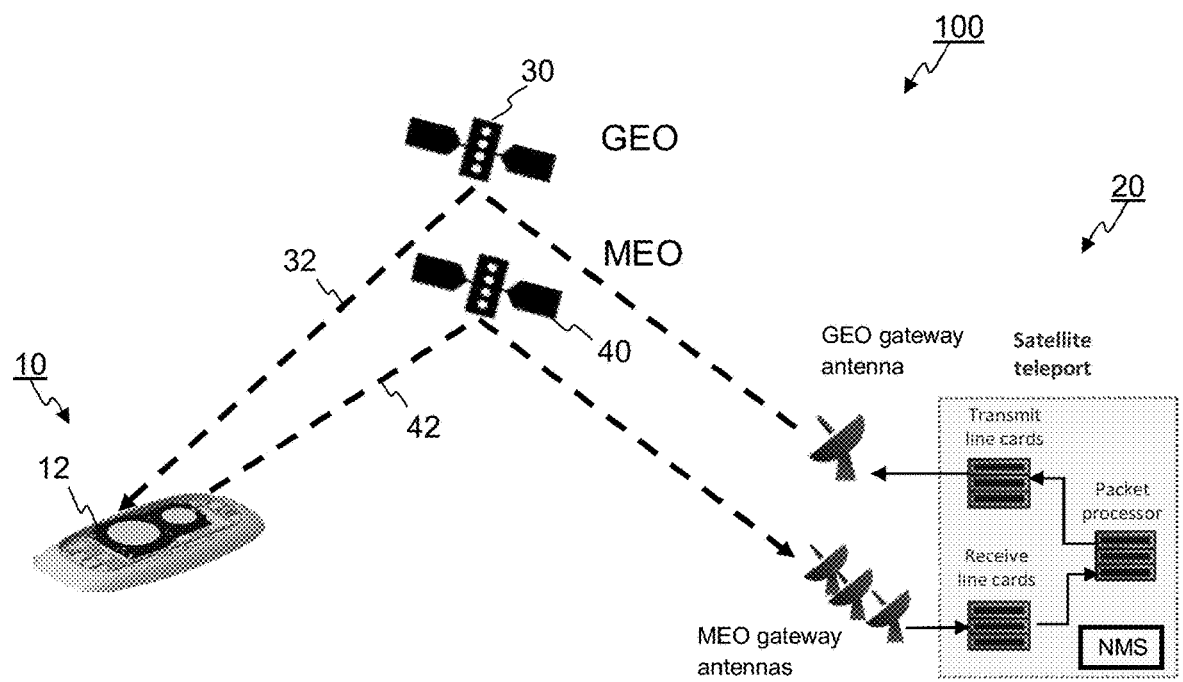
Figure 6:
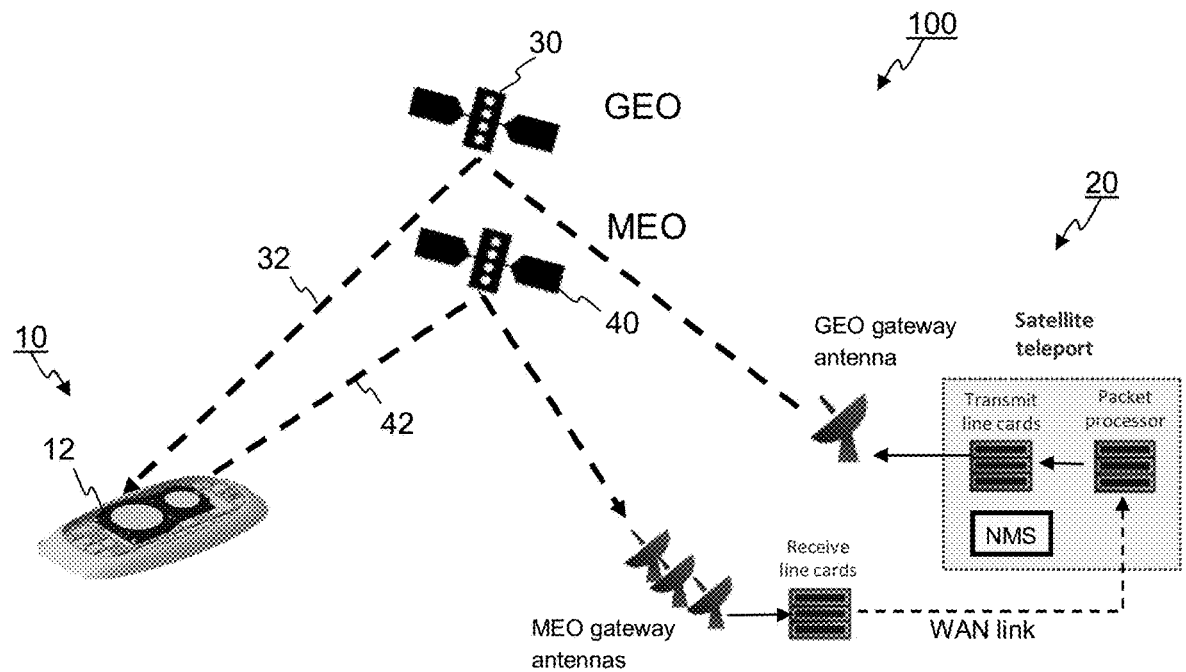

FIG. 4 schematically illustrates a satellite communication system 100 in one embodiment of the invention, in which forward satellite 30 is orbiting the Earth in a GSO 50 and return satellite 40 is orbiting the Earth in a NGSO 60, for example at an altitude lower than that of the GEO 50. In some embodiments, forward satellite 30 is a GEO satellite and return satellite 40 is a MEO satellite (as schematically illustrated in FIGS. 5 and 6). These embodiments are hereinafter referred to as "GEO-FWD-MEO-RET" embodiments.

In other embodiments, forward satellite 30 is a GEO satellite and return satellite 40 is a LEO satellite. These embodiments are hereinafter referred to as "GEO-FWD-LEO-RET" embodiments.

The advantages of GEO-FWD-MEO-RET embodiments have already been discussed above. That is, when terminal 10 is within the coverage of both a GEO satellite 30 and a MEO satellite 40, terminal 10 may receive signals from the GEO (forward) satellite 30 (with lower scan loss) and transmit to the MEO (return) satellite 40 thereby conserving the power on the MEO satellite 40 and terminal 10, and reducing the latency as compared to transmitting and receiving through a single GEO satellite.

The same scan loss issues arise with NGSO satellite constellations other than MEO satellite constellations if the number of satellites in the constellation is small and a phased array antenna is used on the satellite. The small number of satellites providing coverage leads to a higher scan loss at the satellite antenna when it is communicating with the remote terminal at an oblique angle. The above-discussed advantages of the GEO-FWD-MEO-RET embodiments therefore also apply to GEO-FWD-LEO-RET embodiments.

FIG. 5 schematically illustrates a satellite communication system 100 in an exemplary GEO-FWD-MEO-RET embodiment. In that embodiment, the MEO gateway infrastructure and GEO gateway infrastructure are co-located, and a common modem platform is used at gateway 20 for both GEO and MEO links. The transmit intermediate frequency (IF) cable from the modem platform is connected to the GEO uplink while the receive IF link from the MEO gateway equipment is connected to the receive IF cable of the modem platform.

Terminal's 10 multi-beam remote antenna 12 points its receive beam towards GEO satellite 30 while the transmit beam is pointed towards MEO satellite 40. Purely as examples, airborne antennas such as a ThinKom ThinAir 2517 Ka-band antenna system or a ThinKom ThinAir Ku3030 antenna system (available from ThinKom Solutions, Inc., Hawthorne, Calif., USA), which have separate transmit and receive apertures, may be used. Further, terminal 10 uses receive pointing vector 145 towards GEO satellite 30 along with the deterministic changing position of MEO satellite 40 to derive transmit pointing vector 165, as discussed above.

An advantage of this GEO-FWD-MEO-RET access configuration with co-located GEO and MEO gateway equipment is that there is minimal power consumption on MEO satellite 40 to support the return channel. Furthermore, due to the typical asymmetry of Internet traffic, there is typically ample return bandwidth and fairly high return throughputs can be sustained. The round-trip latency may for example be reduced from 2×270=540 msecs (milliseconds) over a GEO-FWD-GEO-RET link to 270+70=340 msecs over the GEO-FWD-MEO-RET link. Other advantages of using the MEO link for the return channel is that the wide separation of the MEO and GEO arcs at high latitudes (i.e., from the perspective of a terminal located at a high latitude on or near Earth) allows terminal 10 to transmit at higher power without causing interference into the GEO arc.

A common ground modem platform operated by one entity and driving both the forward and return links is advantageous in terms of ease of operation and user-friendliness. Indeed, the forward link supported by transmit line cards and the return link supported by receive line cards (as shown in FIG. 5) together with a single authentication/authorization server permits (e.g., airborne) terminal 10 to get service in a centralized way.

Table 1 below shows exemplary return link bit rates that may be achieved using an antenna arrangement 12 (here: a ThinKom ThinAir 2517 Ka-band antenna system) over a constellation of MEO satellites orbiting over the Earth's equator. A decrease in bit rates may be noticed as the terminal's location moves to the north, which is indicative of the loss in gain of the phased array antenna on the (e.g., airborne) terminal 10 and on the satellite.

TABLE 1

| Location | Latitude (approximative) | Return link bit rates |
|---|---|---|
| Atlanta | 33.5 North | 18 Mbps (megabit per second) |
| Los Angeles | 34.3 North | 18 Mbps |
| New York City | 40.5 North | 15.5 Mbps |
| Chicago | 41.5 North | 13.2 Mbps |

(data derived from published ThinKom ThinAir 2517 performance data).

FIG. 6 schematically illustrates a satellite communication system 100 in another exemplary GEO-FWD-MEO-RET embodiment, with geographically separated GEO and MEO gateway equipment. FIG. 5 showed a configuration where the MEO and GEO gateway equipment were co-located. However, co-location is optional. As illustrated in FIG. 6, the signaling information sent on the return link can be routed via a terrestrial link (such as a wide area network (WAN) link) to gateway's 20 common packet processor and network management system (NMS) and the hybrid connectivity can be centrally supported.

In some embodiments, hereinafter referred to as "NGSO-FWD-GEO-RET" embodiments (not illustrated in the drawings), forward satellite 30 is a NGSO satellite (such as a NGSO satellite orbiting the Earth at an altitude lower than that of the GEO) and return satellite 40 is a GEO satellite. NGSO access usually has a constraint that the transmitting terminal has to cease transmission during a conjunction event, i.e. when the transmissions would interfere with a higher-priority system like a GEO satellite. During conjunction events, the NGSO terminal usually attempts to access a different satellite in the NGSO constellation which is not in line with the GEO or higher-priority satellite. With a sparse NGSO constellation, there may not be another NGSO satellite in view or even if there is one, the scan loss from the terminal to this NGSO satellite and from the NGSO satellite to the terminal may be very high. Thus, transmitting towards a GEO satellite and receiving from the NGSO satellite may be advantageous in such a situation.

In some embodiments, hereinafter referred to as "GEO1-FWD-GEO2-RET" embodiments (not illustrated in the drawings), multiple GEO satellites are used. For example, forward satellite 30 may be a first GEO satellite ("GEO1") and return satellite 40 may be a second GEO satellite ("GEO2"). This may be advantageous because there are situations where ample capacity is available on a broadcast-only satellite (i.e., a satellite that can only transmit to remote terminals but cannot receive from terminals) and ample return capacity is available on a conventional two-way satellite. The multi-beam antenna arrangement can thus receive from the broadcast-only satellite and transmit to the two-way satellite.

In one embodiment, terminal's 10 antenna arrangement 12 is a phased-array antenna, such as a beam-forming phased-array antenna. Phased-array antenna arrangement 12 may have a low profile, which may be advantageous from an aerodynamical point of view when used on an aircraft.

In one embodiment, terminal 10 is attached to an aircraft. In such an embodiment, antenna arrangement 12 may be arranged above the fuselage and controller 18 may be attached to antenna arrangement 12 above the fuselage or arranged in a separate unit inside the cabin, for example in a rack with other communications equipment.

Some embodiments of the invention may facilitate use, by terminals at higher latitudes, of a constellation of MEO satellites orbiting over the Earth's equator without excessive consumption of on-board power resources (see above discussion regarding GEO-FWD-MEO-RET embodiments). However, some embodiments involve NGSO systems comprising satellites other than MEO satellites (see above discussion regarding GEO-FWD-LEO-RET embodiments). In addition, embodiments of the invention may assist in using broadcasting-satellite service (BSS) satellites with ample capacity to supplement the capacity of, for example, a Ku-band high-throughput satellite (HTS) fleet (see above discussion regarding GEO1-FWD-GEO2-RET embodiments).

Figure 7:
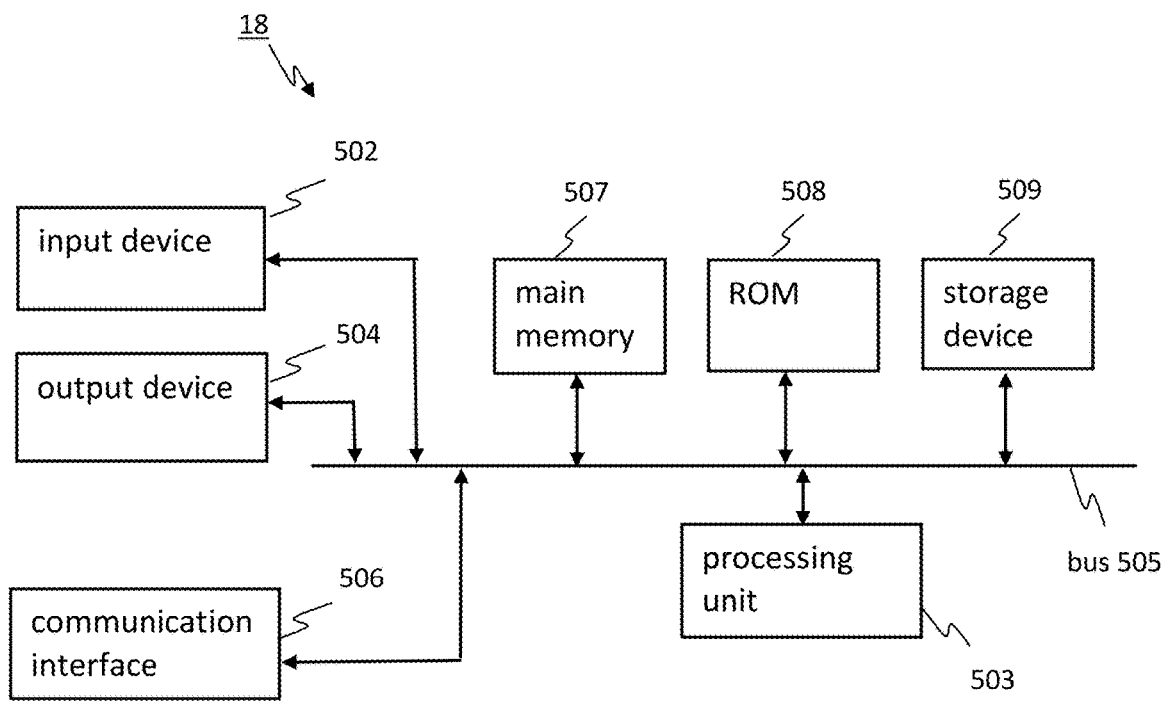
FIG. 7 is a schematic diagram of an exemplary implementation of a controller in one embodiment of the invention.

FIG. 7 is a schematic diagram of an exemplary implementation of a controller 18 that may be used in embodiments of the invention. Namely, controller 18 may for example be implemented using elements such as those schematically illustrated in FIG. 7.

Namely, controller 18 may include a bus 505, a processing unit 503, a main memory 507, a ROM 508, a storage device 509, an input device 502, an output device 504, and a communication interface 506. Bus 505 may include a path that permits communication among the components of controller 18.

Processing unit 503 may include a processor, a microprocessor, or processing logic that may interpret and execute instructions. Main memory 507 may include a RAM or another type of dynamic storage device that may store information and instructions for execution by processing unit 503. ROM 508 may include a ROM device or another type of static storage device that may store static information and instructions for use by processing unit 503. Storage device 509 may include a magnetic and/or optical recording medium and its corresponding drive.

Input device 502 may include a mechanism that permits a user to input information to controller 18, such as a keypad, a keyboard, a mouse, a pen, voice recognition and/or biometric mechanisms, etc. Output device 504 may include a mechanism that outputs information to the user, including a display, a printer, a speaker, etc. Communication interface 506 may include any transceiver-like mechanism, or receiver and transmitter, that enables controller 18 to communicate with other devices and/or systems (such as with antenna arrangement 12). For example, communication interface 506 may include mechanisms for communicating with another device or other devices via a wired or wireless telecommunication network.

Controller 18 may perform certain operations or processes described herein. These operations may be performed in response to processing unit 503 executing software instructions contained in a computer-readable medium, such as main memory 507, ROM 508, and/or storage device 509. A computer-readable medium may be defined as a physical or a logical memory device. For example, a logical memory device may include memory space within a single physical memory device or distributed across multiple physical memory devices. Each of main memory 507, ROM 508 and storage device 509 may include computer-readable media. The magnetic and/or optical recording media (e.g., readable CDs or DVDs) of storage device 509 may also include computer-readable media. The software instructions may be read into main memory 507 from another computer-readable medium, such as storage device 509, or from another device via communication interface 506.

The software instructions contained in main memory 509 may cause processing unit 503 to perform operations or processes described herein, such as steps s182, s183, and s184. Alternatively, hardwired circuitry may be used in place of or in combination with software instructions to implement processes and/or operations described herein. Thus, implementations described herein are not limited to any specific combination of hardware and software.

Figures 8A, 8B:
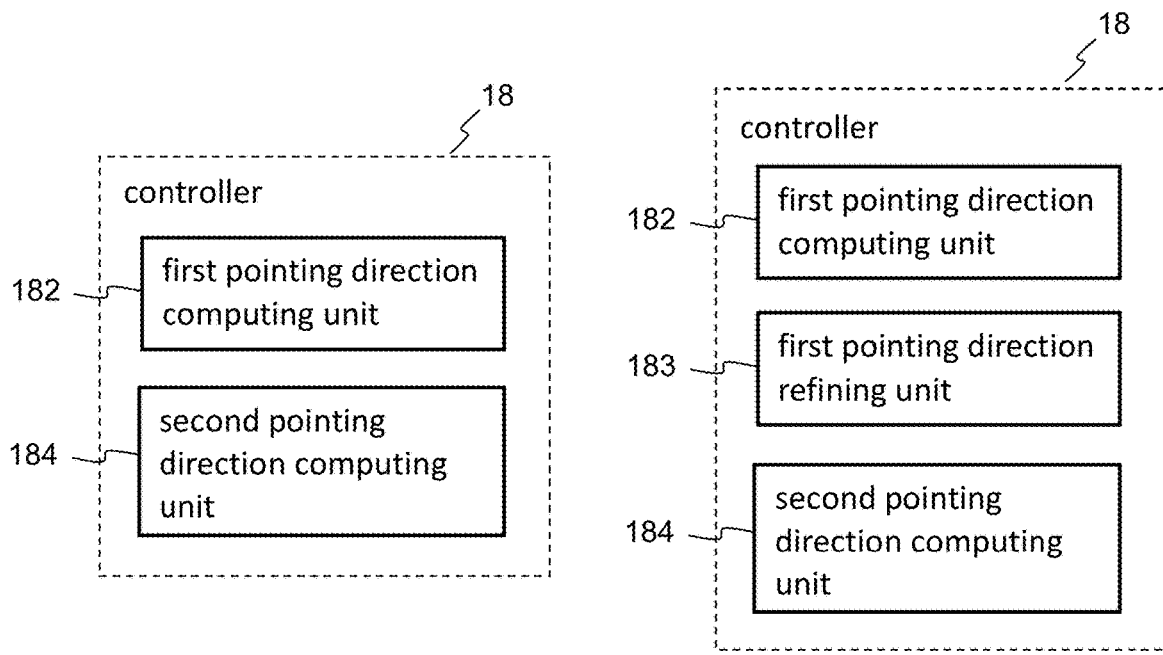
FIGS. 8a and 8b schematically illustrate a controller and functional parts thereof, in two embodiments of the invention.

FIG. 8a schematically illustrates a controller 18 and functional parts thereof, in one embodiment of the invention. Controller 18 may be configured as described with reference to FIGS. 1 and 3a. To do so, it may for example comprise a first pointing direction computing unit 182, and a second pointing direction computing unit 184. First pointing direction computing unit 182 may be configured for computing pointing direction 145 from receive aperture 14 towards forward satellite 30 based on information indicative of the terminal's 10 position and orientation, information indicative of antenna arrangement's 12 geometry, and information indicative of forward satellite's 30 orbital position, while second pointing direction computing unit 184 may be configured for computing pointing direction 165 from transmit aperture 16 towards return satellite 40 based on computed pointing direction 145 from receive aperture 14 towards forward satellite 30 and information indicative of the return satellite's 40 orbital position.

FIG. 8b schematically illustrates a controller 18 and functional parts thereof, in one embodiment of the invention, which differs from controller 18 described with reference to FIG. 8a in that controller 18 is further configured for, prior to computing pointing direction 165 from transmit aperture 16 towards return satellite 40, refining (i.e., adjusting or fine-tuning) pointing direction 145 from receive aperture 14 towards forward satellite 30 based on the received signal strength, i.e. based on the signal strength received at receive aperture 14 from forward satellite 30.

Where the terms "first pointing direction computing unit" 181, "second pointing direction computing unit" 182, etc. are used herewith, no restriction is made regarding how distributed these elements may be and regarding how gathered elements may be. That is, the constituent elements thereof may be distributed in different software or hardware components or devices for bringing about the intended function. A plurality of distinct elements may also be gathered for providing the intended functionalities.

Any one of the above-referred elements or functions of a terminal, a controller, a processing device, a modem, a gateway, or a satellite, may be implemented in hardware, software, field-programmable gate array (FPGA), application-specific integrated circuit (ASIC), and/or firmware, or the like.

In further embodiments of the invention, any one of the above-mentioned first pointing direction computing unit 182, second pointing direction computing unit 184, etc., is replaced by first pointing direction computing means 182, second pointing direction computing means 184, etc. respectively, or, by a first pointing direction processor 182, second pointing direction processor 184, etc. for performing the functions of the above-mentioned first pointing direction computing unit 182, second pointing direction computing unit 184, etc.

In further embodiments of the invention, any one of the above-described steps or processes may be implemented using computer-executable instructions, for example in the form of computer-executable procedures, methods or the like, in any kind of computer languages, and/or in the form of embedded software on firmware, integrated circuits or the like.

Although the present invention has been described based on detailed examples, the examples only serve to provide the skilled person with a better understanding and are not intended to limit the scope of the invention. The scope of the invention is defined by the appended claims.

Abbreviations

ASIC application-specific integrated circuit
BSS broadcasting-satellite service
FPGA field-programmable gate array
FWD forward
GEO geostationary orbit
GSO geosynchronous orbit
HTS high-throughput satellite
IF Intermediate frequency
LEO low Earth orbit
MEO medium Earth orbit
NGSO non-geostationary orbit
NMS network management system
RAM random-access memory
RET return
ROM read-only memory
TLE two-line element (set)
WAN wide area network

The invention claimed is:

1. Terminal for allowing bidirectional communication with a gateway,
the terminal being configured for
receiving information from the gateway through a first satellite orbiting the Earth, said first satellite being hereinafter referred to as "forward satellite"; and
sending information towards the gateway through a second satellite orbiting the Earth, said second satellite being hereinafter referred to as "return satellite";
the terminal comprising:
an antenna arrangement comprising a receive aperture for receiving signals from the forward satellite, and a transmit aperture for transmitting signals to the return satellite; and
a controller configured for
computing a pointing direction from the receive aperture towards the forward satellite based on information indicative of the terminal's position and orientation, the antenna arrangement's geometry, and the forward satellite's orbital position; and
computing a pointing direction from the transmit aperture towards the return satellite based on the computed pointing direction from the receive aperture towards the forward satellite and information indicative of the return satellite's orbital position.

2. Terminal of claim 1, wherein controller is further configured for, prior to computing the pointing direction from the transmit aperture towards the return satellite, refining the pointing direction from the receive aperture towards the forward satellite based on the received signal strength.

3. Terminal of claim 1, configured for communicating with the gateway in a manner according to which at least m percent of the payload information from the gateway to the terminal is transmitted through the forward satellite and at least n percent of the payload information from the terminal to the gateway is transmitted through the return satellite, wherein m is a value in the range of 75 to 100 and n is a value in the range of 75 to 100.

4. Terminal of claim 1, configured for communicating with the gateway in a manner according to which all the payload information from the gateway to the terminal is transmitted through the forward satellite and all the payload information from the terminal to the gateway is transmitted through the return satellite.

5. Terminal according to claim 1, wherein the forward satellite is orbiting in a geosynchronous orbit and the return satellite is orbiting in a non-geosynchronous orbit.

6. Terminal of claim 5, wherein the return satellite is one of a medium Earth orbit satellite and a low Earth orbit satellite.

7. Terminal according to claim 1, further comprising a common modem for serving both the antenna arrangement's receive aperture and transmit aperture.

8. Terminal according to claim 1, wherein the antenna arrangement is a phased-array antenna.

9. Terminal according to claim 1, wherein the terminal is attached to an aircraft.

10. System comprising
a gateway; and
a terminal according to claim 1, for allowing bidirectional communication with the gateway.

11. System of claim 10, wherein the gateway comprises a common modem platform for serving both transmissions through the forward satellite to the terminal and receptions through the return satellite from the terminal.

12. System of claim 10, further comprising the forward satellite and the return satellite.

13. Method for operating a terminal for allowing bidirectional communication with a gateway in such a way that the terminal receives information from the gateway through a first satellite orbiting the Earth, said first satellite being hereinafter referred to as "forward satellite", and that the terminal sends information towards the gateway through a second satellite orbiting the Earth, said second satellite being hereinafter referred to as "return satellite", wherein the terminal comprises:

an antenna arrangement comprising a receive aperture for receiving signals from the forward satellite, and a transmit aperture for transmitting signals to the return satellite; and a controller;

the method comprising:

computing, by the controller, a pointing direction from the receive aperture towards the forward satellite based on information indicative of the terminal's position and orientation, the antenna arrangement's geometry, and the forward satellite's orbital position; and computing, by the controller, a pointing direction from the transmit aperture towards the return satellite based on the computed pointing direction from the receive aperture towards the forward satellite and information indicative of the return satellite's orbital position.

14. Method of claim 13, further comprising, prior to computing the pointing direction from the transmit aperture towards the return satellite, refining, by the controller, the pointing direction from the receive aperture towards the forward satellite based on the received signal strength.

15. Computer program or set of computer programs comprising computer-readable instructions configured, when executed on a computer or set of computers, to cause the computer or set of computers to carry out the method according to claim 13.

* * * * *